Sept. 8, 1936.   E. R. TALBOT   2,053,353
BATTERY TESTING DEVICE
Filed Oct. 21, 1933   3 Sheets-Sheet 1
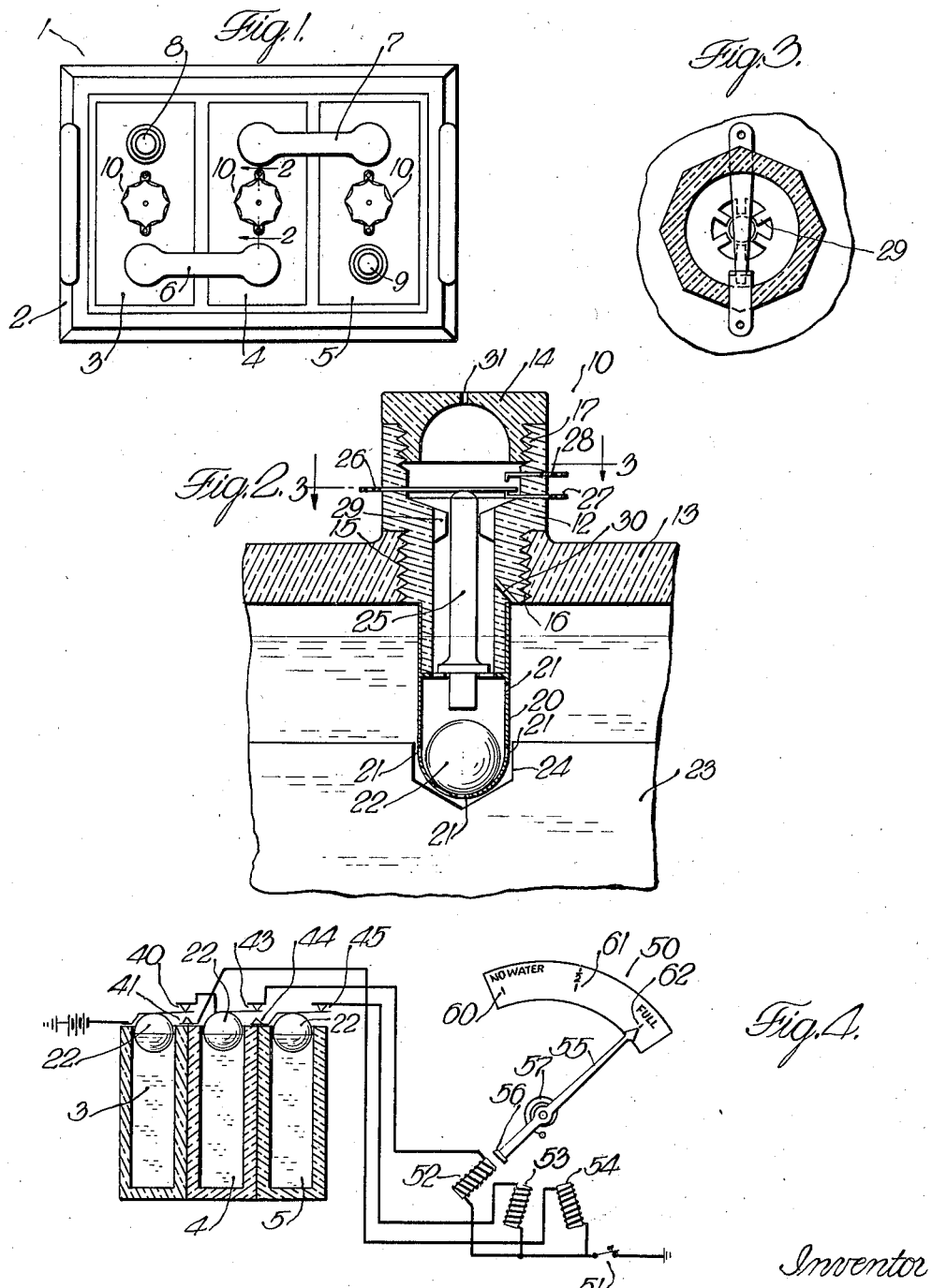
Inventor
Edwin R. Talbot Sept. 8, 1936.  E. R. TALBOT  2,053,353
BATTERY TESTING DEVICE
Filed Oct. 21, 1933   3 Sheets-Sheet 2
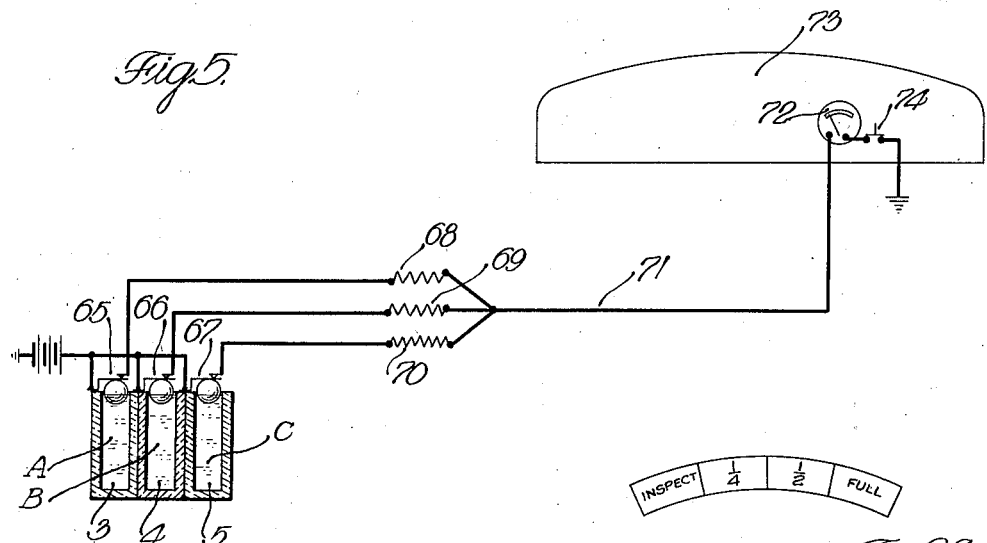
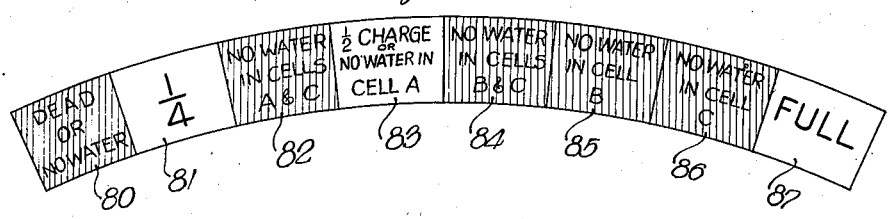
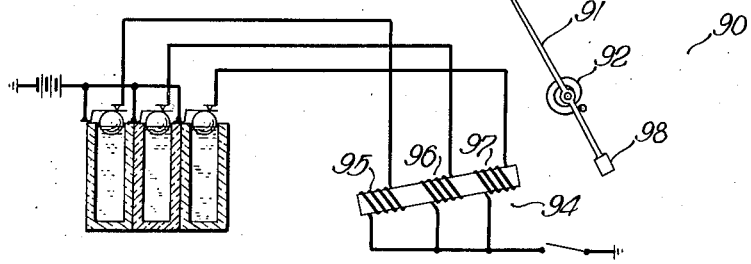
Inventor
Edwin R. Talbot
By Brown Jackson Boettcher Dienner
Attys.

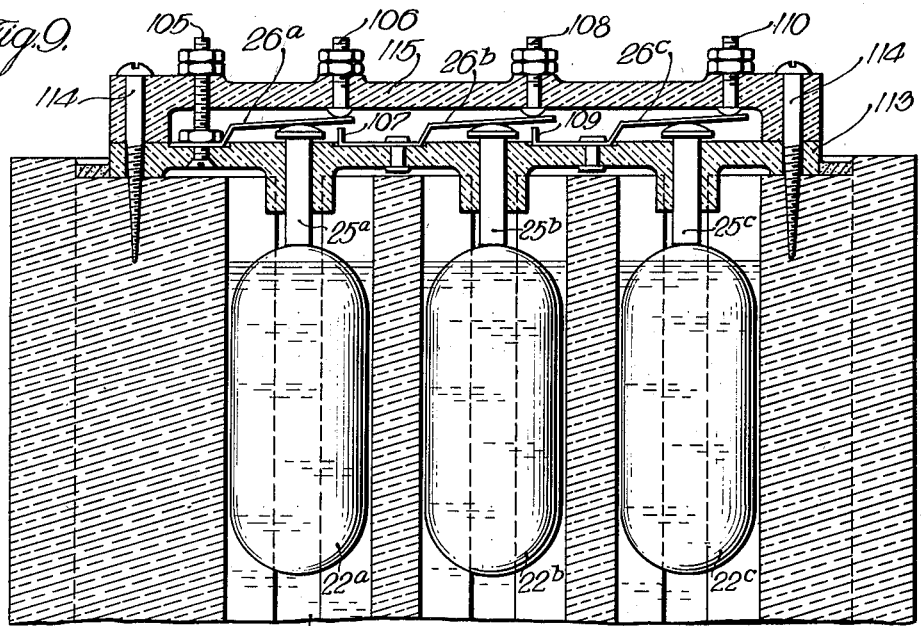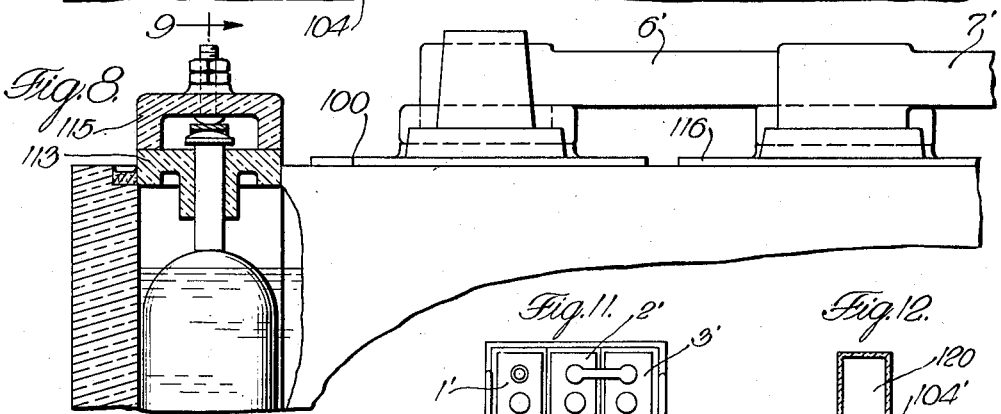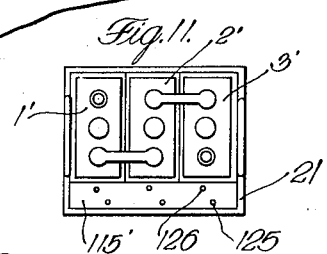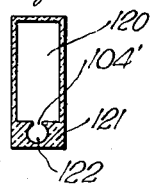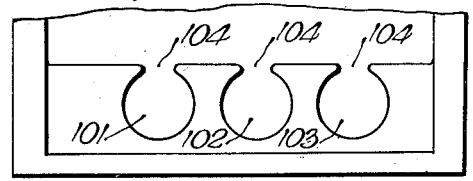

Patented Sept. 8, 1936

2,053,353

UNITED STATES PATENT OFFICE 2,053,353

BATTERY TESTING DEVICE

Edwin R. Talbot, Joliet, Ill.

Application October 21, 1933, Serial No. 694,583

7 Claims. (Cl. 177—311)

This invention relates to storage batteries and to means for indicating the condition of a storage battery.

It is one of the objects of the present invention to provide a storage battery which can be arranged to control an electric circuit to indicate, at a remote point, the condition of charge or discharge of the battery, or the loss of liquid from the battery. While the invention is of general application, it is particularly applicable to installations wherein the battery is so located that access thereto is inconvenient, but where it is desirable to have means for ascertaining the condition of charge of the battery from time to time, as in an automobile.

Consider an automobile storage battery. Such battery consists of a number of cells always subjected to the same electrical conditions of charge and of discharge so that a measure of the condition of one of the cells is, generally, an indication of the condition of the other cells. I provide a number of floats of different specific gravities in different ones of the cells and rely upon one float to respond when the specific gravity of the electrolyte in the cell wherein it is located is such as to indicate a fully charged condition. A different float, located in a different cell, is of a specific gravity such that it will respond when the specific gravity in its cell is such as to indicate a partially charged condition of the cell, say half charged. Other floats, in other cells, may respond to specific gravities indicating different fractional charged conditions of the battery. The floats control contacts which are in an electric circuit with an instrument mounted at some convenient point, as on the dashboard of the automobile, for indicating the condition of the battery.

In the preferred embodiment of my invention each float controls a set of contacts which make or break the desired circuit connections. I have invented a circuit particularly adapted for automobile storage batteries which, by the use of three floats and three resistors, can indicate a loss of electrolyte in any particular cell, and can indicate the charged, half charged, quarter charged, or fully discharged condition of the battery, all at a remote point. The contacts control the resistors in the circuit. With three resistors and a simple contact arrangement, it is possible to get seven combinations of differing resistance values, each of which is utilized to indicate one particular condition of the battery. Another combination, namely, an open circuit, indicates an eighth condition of the battery.

The attainment of the above and further objects of the present invention will be apparent from the following specification taken in conjunction with the accompanying drawings forming a part thereof.

In the drawings:

Figure 1 is a top view of a three-cell storage battery embodying the principles of the present invention;

Figure 2 is an enlarged fragmentary sectional view taken along the line 2—2 of Figure 1;

Figure 3 is a fragmentary sectional view taken along the line 3—3 of Figure 2;

Figure 4 is a diagrammatic view illustrating one embodiment of the circuit connections;

Figure 5 illustrates another circuit arrangement which is preferable to the circuit of Figure 4 in that it gives more complete battery information;

Figure 6 is an enlarged view of the dial of the instrument shown in Figure 5;

Figure 6a is a view of another type of dial;

Figure 7 is a diagram illustrating the application of a different type of instrument to a circuit such as shown in Figure 5;

Figure 8 is a fragmentary view, in partial section, illustrating my invention as applied to the end cell of a storage battery which comprises a number of cells;

Figure 9 is a fragmentary sectional view taken along the line 9—9 of Figure 8;

Figure 10 is a fragmentary detail showing the float chambers of the battery of Figures 8 and 9, with the cover removed;

Figure 11 is a top view of a battery incorporating another embodiment of my invention; and Figure 12 is a section through the casing of one cell of the battery of Figure 11.

Reference may now be had more particularly to Figures 1, 2 and 3 of the drawings. In Figure 1, I have shown a battery of standard construction to which my invention has been applied. The battery is indicated at 1, and is of the ordinary automobile storage battery type, including a case 2 within which are mounted three battery cells indicated at 3, 4 and 5 connected in circuit by means of the usual top connectors 6 and 7, whereby a series connection of the cells is obtained between the terminal posts 8 and 9. This much of the battery is of the usual construction.

Each of the cells is provided with a vent cap 10 of my improved construction, shown more particularly in Figures 2 and 3. My improved vent cap includes a spacer 12 interposed between the top 13 of the cell and a cover 14 which, in the usual battery construction, constitutes the vent cap. In my improved vent cap the spacer 12 is provided with external threads 16 adapted to thread into the top of the battery cell, and with internal threads 17 adapted to receive the cover 14 which, in the usual battery construction, threads into the threads 15. For this purpose the threads 16 and 17 are of the same pitch and of the same kind so that the cover 14 may be threaded directly into the top 13 in the event of need of adjustment or replacement of the spacer.

The spacer 12 carries a tube 20, of suitable insulation, at its lower end, said tube being secured to the spacer in any desired manner. The tube is provided with a number of perforations 21 to permit free entrance of the battery electrolyte thereinto. A float ball 22 is located within the tube 20.

The battery plates 23 are provided with slots or the like, indicated at 24, directly beneath the vent cap opening in the top 13 of each cell. If desired, these slots may be formed after assembly of the battery plates by drilling into the assembled structure to form a circular hole 24 in the assembly at a point in alignment with the vent opening in the top 13. This drilling operation may be performed even after the battery has been assembled within its casing and, preferably, before the electrolyte is poured into the cell. It is merely necessary to lower a drill through the opening that receives the spacer 12 and drill into the battery plate assembly for a depth approximately one inch, or even less. The resulting débris can then be blown out of the cell.

The spacer 12 includes a plunger 25 which is adapted to be raised by the float ball 22 when the float ball rises, as upon an increase in the specific gravity of the electrolyte. The plunger 25 is adapted to engage a contact spring 26 and move the same from one position engaging a contact 27 to another position engaging a contact 28. Adjacent the upper end of the plunger 25 the spacer 12 is provided with a number of wings 29 extending radially inward for guiding the plunger.

Venting of the battery cell is provided by vent openings 30 and 31 in the spacer 12 and the cover 14, respectively.

The float ball 22 is shown in Figure 2 in the position that it occupies when the battery electrolyte is of a specific gravity insufficient to cause the ball to float. The ball 22 may be of such density that it will rise only when the specific gravity of the electrolyte is of a value such as is obtained when the battery is fully charged, or it may be of such density that it will rise when the specific gravity of the electrolyte reaches a value such as prevails when the battery is only fractionally charged, say one-fourth charged, or one-half charged, or three-quarters charged.

In the preferred embodiment of my invention I provide one of the cells of the battery with a float ball 22 that will rise only when the battery is fully charged. At such time the float will cause the spring contact 26 to engage the contact 28. At other times, that is, when the specific gravity of the electrolyte is below that indicative of a fully charged condition of the battery, the float 22 cannot maintain this contact, and the spring 26 therefore engages the contact 27. In another cell I prefer to use a float ball 22 of somewhat lower density so that it will rise when the specific gravity of the electrolyte reaches a value indicative of a half charged condition of the battery. In the third cell I use a still lighter float, that is, one that will rise when the specific gravity of the electrolyte reaches a value indicative of a one-quarter charged condition of the battery, or I may use a float which is so light that it rises in the electrolyte even when the battery is fully discharged or dead. Such float would maintain its spring 26 in engagement with the contact 28 whenever there is a sufficient amount of electrolyte. If the level of the electrolyte falls to a sufficiently low value, the float ball 22 in that cell will lower correspondingly, and permit the associate spring 26 to engage the associated contact 27. This may be taken as an indication of the liquid level in the battery, showing that water must be added to the battery.

In Figure 4 I have indicated, diagrammatically, one suitable form of circuit connection. In this embodiment the three battery cells are indicated by the reference numerals previously used. The float ball 22 in the cell 3 is so light that it will float on the electrolyte even when the specific gravity of the electrolyte reaches a minimum value such as prevails when the battery is fully discharged. This float maintains its upper contact 40 closed whenever there is a sufficient amount of electrolyte in the cell. If the level of the electrolyte should fall below a predetermined amount, the float in this cell will permit an opening of the upper contact 40 and a closure of the lower contact 41.

The float in the cell 4 is preferably of such density that it will float on the electrolyte only when the electrolyte is of such specific gravity as prevails when the battery is fully charged. This float maintains a contact 43 closed when it is in its upper position, and permits closure of a contact 44 when it is in its lower position. The float in the cell 5 is preferably of such density that it will float and maintain its contact 45 closed only when the specific gravity of the electrolyte in this cell is at, or above, a value such as prevails when the battery is half charged.

A suitable instrument 50, controlled by a switch 51, is provided for indicating the condition of the battery. The instrument 50 may be mounted in any convenient location. In the case of an automobile the most convenient location is the dashboard. The instrument includes a number of electromagnets 52, 53 and 54 that control a pointer 55 which carries a magnetic armature 56 at its end. A spring 57 maintains the pointer 55 in a predetermined position when none of the electromagnets is energized. Energization of the magnet 54 causes the pointer 55 to move to a position over the point 60, which indicates that the battery is deficient of water. Energization of the magnet 53 moves the pointer to a position 61, which indicates that the battery is half charged or, at least half charged. Energization of the magnet 52 moves the pointer to the point 62, indicating that the battery is fully charged.

Closure of the switch 51, when the battery is in the condition indicated in Figure 4, will result in an energization of the magnet 52, by way of the closed contacts 40 and 43. The electromagnets 53 and 54 will not be energized, because their circuits are open, respectively, at the contacts 44 and 41. If the float in the cell 4 should drop, indicating that the battery is not fully charged, the contact 43 opens and the contact 44 closes. A closure of the switch 51 at this time results in an energization of the electromagnet 53 by way of the contacts 45, 44 and 40. This indicates that the battery is not fully charged but is at least half charged. A closure of the switch 51, when the floats in the cells 4 and 5 are both down, will not result in the energization of any of the electromagnets. The failure of the pointer 55 to move, under these circumstances, indicates that the battery is not even half charged and, therefore, should be charged. If desired, a back contact may be provided opposite the contact 45, as the contact 44 is opposite the contact 43. This back contact may then be extended to a fourth electromagnet, the energization of which will give a positive indication of the discharged condition of the battery, so that a negative indication, or failure of the pointer 55 to move, can indicate only a defective circuit. This, however, is a refinement which is ordinarily unnecessary. If the float in the cell 3 should drop, indicating a loss of electrolyte, the contact 40 will be opened and the contact 41 closed. A closure of the switch 51 at this time will result in an energization of the electromagnet 54 which, by moving the pointer 55 to the point 60, indicates an insufficiency of electrolyte, or of water.

While I have herein shown the float which indicates the level of the electrolyte as located in the end cell, it may be preferable to place this cell in the center, rather than at the end, since the center cell is most likely to be subjected to loss of electrolyte.

From the above description it is apparent that I have provided a simple and reliable arrangement for indicating, at a remote point, the condition of a storage battery. My invention, as above described, is admirably adapted to the present standard types of automobile storage batteries in that it does not require any substantial change in the present battery construction. There is no increase in the length or width of the battery, nor is there any significant reduction in the capacity of the same by reason of the perforation or drilled hole 24 that receives the tube 20. This is so because the area subtracted from the drilled battery plate 23 by reason of the slot 24 therein is a negligible portion of the total plate area and, further, only a few of the plates are thus reduced in area. The increased cost of the battery is negligible, because the only addition that must be made to a standard battery is the spacer 12 with its float and associated contacts, which is quite inexpensive. The instrument 50 is simple in construction and does not require calibration, since the position of the pointer 55 is determined solely by the magnet energized, rather than by the degree of energization of a magnet or of an operating coil. My present invention can be applied to all automobile storage batteries during the manufacture thereof. If a battery thus constructed is to be used without an indicating device, it is merely necessary to omit the spacer 12 and its associated float and contacts, and to screw the cover or cap 14 directly into the threads 15 in the battery top 13.

Reference may now be had more particularly to Figure 5 wherein I show another, and preferred, circuit arrangement. The three cells of the battery are indicated, as previously, by the reference numerals 3, 4 and 5. The float ball in cell 3 is of such density that it will float, and close its spring contact 65, only when the specific gravity of the electrolyte in this cell is such as prevails when the battery is fully charged. The float ball in the cell 4 is of a somewhat lesser density so that it will float, and close its contact 66, only when the specific gravity of the electrolyte in this cell has increased at least to a value such as prevails when the battery is half charged. The float ball in the cell 5 is of a still lighter density, so that it will float in the electrolyte, and close its contact 67, only when the specific gravity of the electrolyte reaches a value at least equal to that which prevails when the battery is one-quarter charged. Resistors 68, 69 and 70 are connected in circuits by the contacts 65, 66 and 67, respectively. These resistors are of different values and, preferably, bear the relationship of one to two, to four. Suitable values for these resistors are one and one-half ohms for resistor 68, three ohms for resistor 69, and six ohms for resistor 70. These resistors are connected to a common lead wire 71 that extends to an ammeter 72. The ammeter is mounted in any convenient place, as on the dashboard 73, in the case of an automobile battery. The circuit through the ammeter 72 is controlled through a manually operable switch 74.

In the case of a six volt battery, with the values of the resistances 68, 69 and 70 as given, closure of a circuit through the resistor 68 will permit four amperes of current to flow therethrough. Closure of a circuit through the resistor 69 will permit two amperes to flow through this resistor. Closure of a circuit through the resistor 70 will permit one ampere to flow through this resistor. Closure of a circuit through more than one of the resistors 68—70 will cause a current flow through the ammeter which is the sum of the current flowing through the resistors included in the circuit.

A reading of one ampere on the ammeter 72 indicates that the contact 67 is closed and the contacts 65 and 66 are open. This indicates a one-quarter charged condition of the battery. A reading of two amperes on the ammeter 72 indicates that the contact 66 is closed and the contacts 65 and 67 are open. Whenever the contact 66 is closed the contact 67 should necessarily be closed. If the contact 67 is not closed, as evidenced by an ammeter reading of two amperes, this is due to the fact that cell 5 needs water. The fact that the contact 65 is open, at this time, indicates one of two things, namely, either the battery is not fully charged or there is an insufficient amount of water in cell 3. If the ammeter fails to indicate a current flow in excess of two amperes, after a continuation of the charging of the battery, the operator knows that cell 3, as well as cell 1, lacks water.

A reading of three amperes on the instrument 72 indicates that the contacts 66 and 67 are both closed, hence the battery is at least half charged, but not necessarily fully charged. If the reading of three amperes persists after a continuation of the battery charging period to an extent such as would normally charge the battery fully, the operator knows that cell 3 contains no water but that cells 4 and 5 do contain a sufficient amount of water.

If the ammeter indicates a current flow of four amperes, the operator knows that contact 65 is closed, indicating a fully charged condition of the battery, and that contacts 66 and 67 are open, indicating that cells 4 and 5 lack water.

If the ammeter indicates a current flow of five amperes, the operator knows that contacts 65 and 67 are closed and that contact 66 is open, a condition which can prevail only if cell 4 lacks water.

If the ammeter indicates a current flow of six amperes, the operator knows that contacts 65 and 66 are closed and that contact 67 is open, a condition which can prevail only when cell 5 lacks water.

If the ammeter reads seven amperes, the operator knows that contacts 65, 66 and 67 are all closed, a condition which can prevail only when the battery is fully charged and all of the cells have a sufficient amount of water.

If the ammeter fails to give any reading whatsoever, the operator knows that all of the contacts are open and, therefore, the battery must be dead, or all three cells lack water. The operator may readily determine whether the condition is due to a lack of water or a lack of charge, by charging the battery for a small period of time, that is, for a period which will normally result in a quarter charge of the battery. If the zero reading persists, the operator knows that there is a lack of water in all three cells.

Instead of relying upon the operator to interpret the ammeter readings, as above set forth, the instrument may be calibrated, or marked, to give the above mentioned information. A dial so calibrated is indicated in Figure 6, the cells A, B and C being, respectively, the cells 3, 4 and 5. The dial is divided into a number of spaces, indicated by the reference numerals 80 through 87. The space 80 is marked "Dead or no water". The space 81, which includes the range of travel of the instrument pointer from one-half ampere to one and one-half amperes, is marked "¼". The space 82, which includes the range of travel of the instrument pointer from one and one-half amperes to two and one-half amperes, is marked "No water in cells A and C". The portion 83, which includes the range of travel of the instrument pointer from two and one-half amperes to three and one-half amperes, is marked "½ Charge or no water in cell A". The centers of the spaces 84, 85, 86 and 87 correspond, respectively, to the positions of the instrument pointer when the current flowing through the instrument is, respectively, four amperes, five amperes, six amperes and seven amperes. The space 84 is marked to indicate a lack of water in cells B and C; the space 85 indicates a lack of water in cell B; and the space 86 indicates a lack of water in cell C. The space 87 indicates a fully charged battery with none of the cells lacking water. The portions 82, 84, 85 and 86 of the instrument scale may be of a distinctive color—red—to indicate a condition dangerous to the battery, in that a movement of the instrument pointer to any of these spaces indicates that one or more cells of the battery needs water. A similarly distinctive red color may be applied to the portion 80 of the scale, since stoppage of the pointer on this portion may also indicate a lack of water.

If desired, for the sake of simplicity, the portions 82, 84, 85 and 86 of the dial may omit the information as to which cell lacks water, it being sufficient to indicate only a lack of water. Those sections of the dial may be marked with instructions to add water. Once an operator is apprised of the fact that one of the battery cells needs water there is no particular difficulty in determining, by inspection, to which cell the water must be added. At this time water may be added also to those cells where the electrolyte level has not yet reached its minimum safe value.

If desired, for further simplicity, the resistors 68, 69 and 70 of Figure 5 may all be of like values.

Under such circumstances like current will flow through each of the resistors upon closure of the respective contacts 65—66—67. The scale of the ammeter 72 may be calibrated as indicated in Figure 6a so that a closure of one of the contacts will permit an amount of current to flow through the ammeter sufficient to indicate a quarter charged condition of the battery. A closure of two of the contacts will permit a current flow in amount sufficient to indicate a half charged condition of the battery. A closure of all three contacts will permit a current flow sufficient to indicate a fully charged condition of the battery. A closure of the switch 74 when all of the contacts are open will cause no deflection, thereby indicating to the operator that the battery is either discharged or needs inspection. If the ammeter does not indicate more than a half charged condition of the battery even after the charging has been continued for a reasonable length of time, the operator is thereby apprised of the fact that at least one of the cells is deficient of water.

In Figure 7 I have shown a circuit for accomplishing the result of the circuit of Figure 5 without the use of an ammeter, a somewhat different type of measuring instrument being provided. In this circuit the measuring instrument is indicated at 90 and includes a pointer 91 biased by a spring 92 to its zero position, and movable over a dial 93 which is marked in the same manner as is the dial shown in Figure 6. The pointer 91 is actuated by an electromagnet 94 provided with three operating windings 95, 96 and 97. Upon energization of one or more of the coils 95—96—97, an armature 98 of the pointer 95 is attracted toward the electromagnet, the extent of movement being determined by the magnetic force of attraction. The ampere turns of the coils 95—96—97 may bear the same relationship to each other as do the resistances of the resistors 68—69—70, so that the coil 96 has twice as many ampere turns as the coil 97, and the coil 95 has twice as many turns as the coil 96. These coils may all have the same number of turns and be of resistance values corresponding to the resistances of the resistors 68—69—70, respectively, of the system shown in Figure 5. An energization of all three magnetic coils will move the pointer 91 to its extreme position, that is, to the space 97, indicating a fully charged condition of the battery. The energization of different ones of the coils, or different combinations of coils, produces effects similar to those produced by energization of the ammeter 72 through the corresponding resistors, or combinations of resistors, as pointed out above in connection with the description of Figure 5. It is believed that a repetition of this description as applicable to Figure 7 is not necessary.

If desired, the coils 95—96—97 may be of identical construction, in which case the dial of the instrument 90 would be as shown in Figure 6a, rather than as shown in Figure 6.

Reference may now be had more particularly to Figures 8, 9 and 10, wherein I have shown my invention applied to a single cell of a battery which may comprise one or more cells. In this construction the cell is indicated at 100. One end of the cell is provided with an extension defining three separate cylindrical pockets 101, 102 and 103, all of which communicate directly with the interior of the cell by way of openings 104. The cylindrical pockets extend from the top of the cell downwardly to the very bottom, or half way, or less, if desired. Floats 22a, 22b and 22c are located in the respective pockets 101, 102 and 103, said floats being of differing densities, as are the floats 22 in the modification previously described. The floats control plungers 25a, 25b and 25c which, in turn, control contact springs 26a, 26b and 26c, respectively. The contact spring 26 is connected, at one end, to a terminal 105. The spring 26a, in its upper position, engages a terminal 106, and in its lower or normal position engages a projection 107 of the contact spring 26b. In a like manner the spring 26b, in its upper position, engages a terminal 108, and in its lower position engages a projection 109 of the spring 26c. The spring 26c, in its upper position, engages a terminal 110. The terminal 105 may be connected to the ungrounded side of the battery. The terminals 106, 108 and 110 are connected, respectively, to the magnets 52, 53 and 54 of an instrument such as indicated at 50 in Figure 4. For this purpose the float 22a is made of a density sufficient to permit it to sink when the specific gravity of the electrolyte reaches a value below that which prevails when the battery is fully charged. The float 22b is of a density such that it will sink only if the specific gravity of the electrolyte falls below the value such as prevails when the battery is half charged. The float 22c is of a density such that it will sink when the specific gravity of the electrolyte falls to a value below that which prevails when the battery is one-quarter charged. In a system employing a battery such as shown in Figure 9, the point 60 of the instrument therefore indicates a quarter charged condition of the battery, rather than an insufficient amount of electrolyte. It is, of course, apparent from the description thus far given that one of the floats, preferably the float 22c, can be made of a lighter density to indicate only a loss of electrolyte and that the circuit connections between the terminals 105, 106, 108 and 110 can be changed to correspond with the connections of Figure 4, whereby an indication of a a loss of electrolyte may be had.

The contact springs 26a—26b—26c and the respective plungers are carried by a rectangular plate-like member 113 of rubber composition or other acid resisting insulation, which forms a closure for the pockets 101—102—103 and which is held in place by screws 114 that are threaded through a plate 115 and into the battery case. The plate 115 carries the various contacts.

The cell of Figure 9 is shown in Figure 8 as one cell of a battery containing a number of cells, a second cell being indicated at 116. The various cells of this battery are connected together by top connectors 6' and 7' in a manner similar to that shown in Figure 1.

In the arrangement shown in Figures 8 and 9 it is possible to use float members 22a—22b—22c of appreciably larger volume than the volume of the float balls shown in Figure 2. This permits the obtaining of an appreciably greater force to operate the switch contacts.

In Figures 11 and 12 I have illustrated an arrangement for embodying my present invention in a battery without in any way altering the construction or assembly of the battery plates. The battery is shown as comprising a number of cells 1'—2'—3' connected together in the usual manner. Each of the cells is of a shape such as shown in Figure 12 and includes a battery plate receiving portion 120 of a length and breadth the same as that of the inside of the cells of the battery shown in Figure 1. Adjacent one end of the battery there is an enlarged portion 121 containing a pocket 122 communicating with the space 120 by way of a longitudinally extending opening 104'. The pocket 122 is adapted to contain float members such as indicated at 22a. The float in the pocket 122 actuates switch contacts in the same manner as do the floats shown in Figures 8 and 9. This construction differs from that of Figures 8 and 9 in that here each cell is provided with only one pocket, whereas in Figures 8 and 9 the cell is provided with three pockets. A closure plate 115' extends over the pocket 122 of each of the cells, being secured in place in the same manner as is the corresponding structure of Figures 8 and 9, said cover or plate carrying contacts in the same manner as illustrated in Figures 8 and 9. Each set of con-contacts is provided with two terminals indicated at 125—126, whereby the desired electrical connections may be made. The floats of the respective cells are of different densities, corresponding to the densities of the floats 22 of the different cells shown in Figure 1. The connections, external of the battery, may be such as illustrated in Figures 5 or 7. Any other desired electrical connection may, of course, be made.

The three cells 1'—2'—3' are contained in a battery box 21 which may differ from the standard type of battery boxes only in that it is somewhat wider, to accommodate the extensions 121.

The embodiment of my invention illustrated in Figures 11 and 12 involves a change in the shape of the individual battery cells, but it does not involve any change in the battery plate construction or in the manner of assembling or holding the battery plates. This contemplates only a very small change in the equipment needed in the manufacture of batteries, and can be made with a minimum of change in the manufacturing organization and procedure.

In compliance with the requirements of the patent statutes I have herein shown and described a few preferred embodiments of my invention. It is, however, to be understood that the invention is not limited to the precise arrangement herein shown, the same being merely illustrative of the principles of the invention. What I consider new and desire to secure by Letters Patent is:

1. In combination with a wet cell storage battery, a plurality of floats in the electrolyte of the battery, one of the floats being of an effective density such that it floats only when the specific gravity of the electrolyte is at least such as prevails when the battery is substantially fully charged, another float being of a density such that it floats only when the specific gravity of the electrolyte is at least such as prevails when the battery is charged to a predetermined fractional part of its fully charged condition, and a third float of a lower density than that of the other two floats, contacts controlled by the respective floats, at least one of said floats controlling its contacts responsive to a change in level of the electrolyte, and at least the other two floats controlling their contacts responsive to change in specific gravity of the battery electrolyte when the level of electrolyte is substantially normal, and means simultaneously under the control of the float controlled contacts for indicating the abnormal level of the electrolyte when such condition exists and, when the electrolyte level is normal, for indication when the battery is fractionally charged and when the battery is fully charged, said means comprising an electro-responsive instrument and circuit connections between the instrument and the respective battery float controlled contacts and simultaneously under the control of at least two different float controlled contacts.

2. In combination with a wet cell storage battery, a plurality of floats in the electrolyte of the battery, one of the floats being of an effective density such that it floats only when the specific gravity of the electrolyte is at least such as prevails when the battery is substantially fully charged, another float being of a density such that it floats only when the specific gravity of the electrolyte is at least such as prevails when the battery is charged to a predetermined fractional part of its fully charged condition, and a third float of a lower density than that of the other two floats, contacts controlled by the respective floats, at least one of said floats controlling its contacts responsive to a change in level of the electrolyte, and at least the other two floats controlling their contacts responsive to change in specific gravity of the battery electrolyte when the level of electrolyte is substantially normal, an electrically operated indicator, means responsive to the operation of any of the float controlled contacts for operating the indicator to a position characteristic of the particular contact operated and different from the position to which the indicator is operated responsive to the operation of the contacts controlled by the other floats, whereby the position to which the indicator is operated shows which float has operated its contacts.

3. In a wet cell battery having a plurality of cells, a plurality of floats in the electrolyte of said battery, each of said floats being of a progressively decreasing effective density such that each one thereof floats only when the specific gravity of said electroylte is at or above the condition representing the condition of charge of said battery to which the corresponding float is responsive, contacts for each of said floats closed by floatation of the corresponding float, at least one of said floats controlling its contacts responsive to a change in level of the electrolyte, the other floats controlling their contacts responsive to changes in specific gravity of said electrolyte when the level of said electrolyte remains substantially normal, an electrically operated indicator, and means responsive to the operation of any of the float-controlled contacts for operating the indicator to a position characteristic only of the particular contact operated, whereby the position to which the indicator is operated shows which float has operated its contacts.

4. In a wet cell battery of the class described, a plurality of floats in the electrolyte of said battery, indicating means responsive to current variations for indicating the condition of charge of said battery, electrical means connected to a source of current for actuating said indicating means including a plurality of normally open contacts adapted to be selectively closed upon floatation of corresponding selected ones of said floats, said floats being of progressively decreasing effective density corresponding to the specific gravity of said electrolyte at different percentages of full charge condition of said battery whereby all of said floats are adapted to float to close all of said contacts upon full charge condition of said battery, and to open their corresponding contacts as the specific gravity of said electrolyte decreases proportionally to the decrease in the percentage charge condition of said battery, at least one of said floats opening its contacts responsive only to a decrease in level of said electrolyte while the other of said floats control their contacts in accordance with the specific gravity of said electrolyte when said level remains normal, said electrical means including current controlling means in series with said contacts and controlled by operation of said contacts to produce a predetermined individual operating characteristic of said indicating means whereby said indicating means shows which float has operated its contacts.

5. In combination, a wet cell battery, a plurality of floats in said battery, each of said floats being of a different effective density proportional to the specific gravity of said electrolyte corresponding to selected different conditions of charge in said battery, contacts controlled by each of said floats, electrically operated indicating means, at least one of said floats controlling its contacts responsive to changes in level of said electrolyte while the other of said floats control their respective contacts in accordance with the specific gravity of said electrolyte while the level remains substantially normal, and means connected between said contacts and said indicating means and controlled selectively by operation of said contacts for operating said indicating means to a position characteristic only of the particular contact operated whereby said position indicates which float has operated its contacts.

6. In combination, a wet cell battery, three floats of different effective densities in the electrolyte of said battery, an indicating meter, a source of current, a pair of contacts controlled by each of said floats, one of each pair of contacts being connected to said current source, the other of each of said pairs of contacts being connected to said meter, meter controlling means interposed between each of said other of said pairs of contacts and said meter, said controlling means each having a different control characteristic with respect to said meter, each of said floats controlling its contacts in accordance with the variation in specific gravity of said electrolyte corresponding to its effective densty whereby said contacts are closed selectively in accordance with different conditions of charge in said battery, said controlling means selectively controlling operation of said indicating meter to show which of said contacts has been operated, said contacts also being controlled by said floats responsive to the level of said electrolyte in said battery.

7. In a wet cell storage battery, a plurality of floats in the electrolyte of said battery, said floats being of different effective densities, contacts for each of the floats controlled by floatation of the corresponding float, an indicating means, a source of current for acutating said indicating means and including said contacts, current controlling means connected to each of said contacts and adapted to be selectively connected between said source of current and said indicating means in accordance with operation of the corresponding contacts by said floats, at least one of said floats being responsive to the level of said electrolyte, and all of said floats being responsive to the specific gravity of said electrolyte when said level remains substantially normal for controlling said contacts selectively in accordance with the condition of charge of said battery as determined by the specific gravity of said electrolyte.

EDWIN R. TALBOT.